(12) United States Patent
Braford, Jr.

(10) Patent No.: US 6,213,272 B1
(45) Date of Patent: Apr. 10, 2001

(54) AUTOMATIC TRANSMISSION HAVING NESTED CLUTCH HOUSINGS

(75) Inventor: Thomas E. Braford, Jr., Brighton, MI (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/382,134

(22) Filed: Aug. 24, 1999

(51) Int. Cl.[7] ................................................. F16D 25/10
(52) U.S. Cl. ........................ 192/87.11; 192/85 AA; 192/48.8
(58) Field of Search ......................... 192/87.11, 87.14, 192/87.15, 85 AA, 48.8, 48.91; 29/469

(56) References Cited

U.S. PATENT DOCUMENTS

| | | | |
|---|---|---|---|
| 2,946,241 | * 7/1960 | Snyder | 192/87.15 X |
| 4,454,786 | * 6/1984 | Stockton | 192/87.15 X |
| 4,716,787 | * 1/1988 | Miura et al. | 192/87.11 X |
| 5,029,685 | * 7/1991 | Takase et al. | 192/48.91 |
| 5,579,883 | 12/1996 | Tsukamoto et al. . | |
| 5,913,397 | 6/1999 | Okada et al. . | |

* cited by examiner

Primary Examiner—Richard M. Lorence
(74) Attorney, Agent, or Firm—Reising, Ethington, Barnes, Kiesselle et al.; Greg Dziegielewski

(57) ABSTRACT

A friction device includes nested clutch housings one of which has a preassembled clutch pack therein and a retention surface thereon that hold a clutch packs in place within the other housing.

14 Claims, 1 Drawing Sheet

AUTOMATIC TRANSMISSION HAVING NESTED CLUTCH HOUSINGS

FIELD OF THE INVENTION

The present invention relates, generally, to friction devices such as clutch or brake assemblies for use in transmissions, differentials or brake systems. More specifically, the present invention relates to multi-disk friction clutch or brake systems for use in such in transmissions or differentials.

DESCRIPTION OF THE RELATED ART

Multi-disk friction devices are employed in a wide range of applications as clutches or brakes. For example, such friction devices are frequently used in land-based vehicles. Generally speaking, land vehicles require three basic components. These components include a power plant (such as an internal combustion engine), a powertrain and wheels. The powertrain's main component is typically referred to as the "transmission." Engine torque and speed are converted in the transmission in accordance with the tractive-power demand of the vehicle. Transmissions include one or more gear sets, which may include an inner sun gear, intermediate planet gears that are supported by their carriers and outer ring gears. Various components of the gear sets are held or powered to change the gear ratios in the transmission. The multi-disk pack clutch is a friction device, which is commonly employed as a holding mechanism in a transmission or differential. In addition, multi-disk friction devices also find use in industrial applications, such as wet brakes, for example, to brake the wheels on earth moving equipment.

The multi-disk pack clutch or brake assembly has a clutch sub-assembly including a set of plates and a set of friction disks, which are interleaved between one another. The plates and friction disks are bathed in a continual flow of lubricant and in "open pack" operation normally turn past one another without contact. The clutch or brake assembly also typically includes a piston. When a component of a gear set is to be held, as for example during a particular gear range, a piston is actuated so as to cause the plates and friction disks to come in contact with respect to one another. In certain applications, it is known to employ several multi-disk pack friction devices in combination to establish different drive connections throughout the transmission or differential to provide various gear ratios in operation, or to brake a component.

In the past in order to assemble such arrangements in the clutch or speed reduction sections of a multi-speed transmission, an assembly line has included a separate station for each clutch pack that is prestacked and then assembled so that externally splined separator plates and internally splined friction discs can be connected as a unit to the respective drive or braking components of the transmission. In such assembly operations, after each clutch pack is assembled a snap ring is inserted following insertion of a selected clutch pack at its assembly station so as to secure the clutch pack in place.

The use of preassembled unitary subassemblies is desirable in the manufacture of multi-speed automatic transmissions since they can be assembled off-site and easily assembled within a transmission case provided by an original equipment manufacturer.

SUMMARY OF THE INVENTION

In order to provide greater flexibility in the assembly of automatic transmission it is desirable to provide nested clutch housings including two clutch packs wherein one of the clutch packs has a housing that is nested in a second clutch pack housings so as to hold a clutch pack in the second housing thereby to facilitate assembly at a single work station and to use only a single connector to retain two clutch packs in place.

A feature of the present invention is that a nested clutch housing provides a preassembled clutch pack and a cavity that is sealed with respect to the other clutch housing for providing actuating fluid for the preassembled clutch pack.

A further advantage is to provide such a nested clutch housing assembly that eliminates the need for a clutch pack assembly station.

A still further advantage of the invention is to provide a compact, easily assembled friction clutch arrangement for use in transmissions wherein the axial length of the assembled units is reduced.

A further objective of the invention is to provide a method for assembly of clutch devices in a transmission including the steps of providing a first clutch housing having an open end and an inner diameter surface; providing a second clutch housing having an outer diameter surface configured to be nested in seated relationship within the inner diameter surface; providing first and second clutch packs; connecting one of the first and second clutch packs within the first clutch housing; and preassembling the other of the clutch packs with the second clutch housing; axially nesting the second clutch housing with the preassembled other of the clutch packs into the first clutch housing and engaging the retention surface of the second clutch housing against the one of the first and second clutch packs for retaining it within the first clutch housing.

BRIEF DESCRIPTION OF THE DRAWINGS

Other advantages of the invention will be readily appreciated, as the same becomes better understood by reference to the following detailed description when considered in connection with the accompanying drawings, wherein.

DETAILED DESCRIPTION OF A PREFERRED EMBODIMENT

Figure 1:
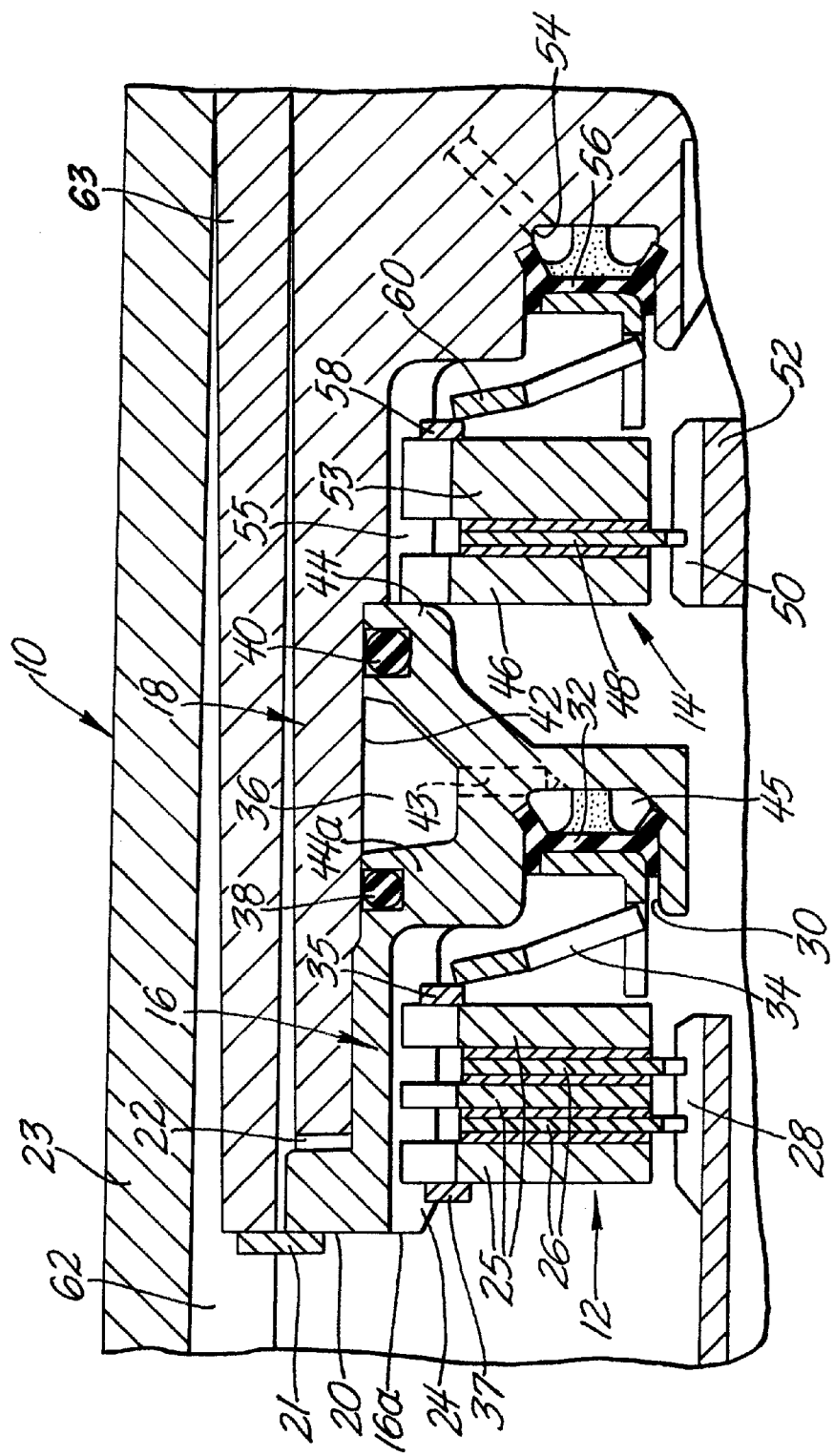
FIG. 1 is a partial cross-sectional side view illustrating a friction device of the present invention including the nested clutch assembly of the present invention.

Referring now to FIG. 1, a friction device such as a clutch or brake assembly of the present invention is a friction device generally indicated at 10. The friction device 10 is adapted to be employed in connection with a transmission, differential or brake system. For example only, and not by way of limitation, as is commonly known in the art, but not shown in these figures, transmission assemblies typically include an input shaft which is operatively coupled to a prime mover, such as an internal combustion engine. In an automotive application, the transmission assembly also includes an output shaft, which is operatively coupled to driven wheels through other drivetrain components such as a drive shaft and an axle having a differential. At least one, and often a plurality of, gear sets is operatively coupled between the input and output shafts. The transmission casing supports the input shaft, the output shaft and the gear sets of the transmission assembly.

Various components of the gear sets are held or powered to change the gear ratio in the transmission. To this end, the transmission assembly will typically include at least one friction device 10. However, it will be appreciated by those having ordinary skill in the art that the transmission assembly may employ any number of friction devices adapted to hold or power gear sets to change the gear ratio of the transmission. Further, and notwithstanding the automotive related context of the discussion above, from the description that follows, those having ordinary skill in the art will appreciate that the present invention may be employed in a transmission, differential or brake system whether used in an automotive, non-automotive or industrial application. Thus, to the extent the term "clutch" is used below in any context, this term should be given its broadest possible meaning including, but not limited to, clutches and brakes for use in transmissions, differential or braking systems of all types.

The friction device 10 in the present invention includes dual axially arranged clutch packs 12, 14 operable in this instance to brake a transmission component. The clutch pack 12 is housed in a first clutch housing 16 that is nested with a second clutch housing 18 at an open end 20 thereof. The housing 16 is secured to the second housing 18. A plurality of circumferentially spaced tabs 20 on the outbound end of housing 16, interlock with a plurality of grooves 22 on end 20. A snap ring 21 secures the nested housings 16, 18 to a transmission case 23.

The housing 16 has grounded splined surface 24 secured to externally splined plates 25. Internally splined friction discs 26 interleaved with plates 25 are connected to a splined hub 28 selectively braked by clutch pack 12. The housing 16 includes a bore 30 that receives an operating piston 32 held in a release position by a spring 34. The spring 34 is grounded on a snap ring 35 secured to surface 24 and engages the piston 32 at its ID. A second snap ring 37 is secured to surface 24 outboard of pack 12 to hold it within an opened end 16a of housing 16.

In accordance with one aspect of the invention the housing 16 has an outer peripheral cavity 36 therein that is sealed on either axial end there of by spaced O-rings 38, 40 that are sealed against a sealing surface 42 on an inner diameter of the housing 18. As seen in FIG. 1, the first housing 16 more particularly has the seals 38, 40 located within a pair of spaced radially outwardly directed shoulders 44, 44a so as to be carried by the first clutch housing 16 and sealed against said sealing surface 42. The cavity 36 is connected to a source of lubricant for and directing pressure fluid through a passage 43 into a variable volume chamber 45 formed between piston 32 and housing 16.

In accordance with another aspect of the invention the housing 16 includes a radially outwardly located shoulder 44 thereon that engages the outboard most externally splined plate 46 of the clutch pack 14 and thus constitutes a fixed retention surface for holding the clutch pack 14 in assembled relation within the housing 18. The clutch pack 14 further includes an internally splined friction disc 48 that is secured to the splined hub 50 of a selectively braked rotating member 52 in an automatic transmission. The plate 46 and another inbound separator plate 53 are grounded to a splined ID surface 55 of the housing 18 whereby the clutch pack 14 serves to brake the driven member. The housing 18 includes an annular bore 54 that receives a piston 56 for actuating the clutch pack 14. The inner most one of the plates 53 is held in place by a snap ring 58 and a disc spring 60 is grounded on the ring 58 and the piston 56 for providing a spring return action thereon.

The clutch packs 12, 14 are annular packs surrounding a common axis and one half of each pack is generally indicated at 12 and 14. Packs 12, 14 operatively are interposed between the grounded member 18 and driven members 28 and 52 and operate to connect and disconnect the grounded member and driven members for translating and interrupting torque therebetween.

In accordance with one aspect of the invention the clutch housing 18 is a drop in housing that is grounded to an outer transmission case 23 at a rib 62 formed on the interior surface thereof. The rib 62 interlocks with a connector member 63 that is held in place by the snap ring 21.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A friction device comprising:
   a transmission case;
   a first clutch housing having a preassembled first clutch pack therein;
   a second clutch housing arranged coaxially of said first clutch housing;
   said second clutch housing grounded to said transmission case;
   a second clutch pack located within said second clutch housing and said first clutch housing having a radially outwardly located shoulder thereon engaging said second clutch pack and configured for nesting within said second housing for securing said second clutch pack within said second clutch housing.

2. A friction device as set-forth in claim 1 wherein said second clutch housing has an open end and an inside diameter thereon; said first clutch housing having an outside diameter thereon nested within said inside diameter of said second clutch housing and coacting means on said first and second clutch housings for connecting them together against relative rotation therebetween.

3. A friction device as set-forth in claim 2 wherein said inside diameter is a sealing surface and said first clutch housing having a pair of spaced radially outwardly directed shoulders thereon and seals located within said pair of spaced radially outwardly directed shoulders to be carried by said first clutch housing and sealed against said sealing surface.

4. A friction device as set-forth in claim 3, said first clutch housing having a cavity in said outside diameter of said first clutch housing and said seals defined by a pair of annular O-rings located within said pair of spaced radially outwardly directed shoulders for sealing said cavity for sealing a lubricant path including said cavity.

5. A friction device as set forth in claim 4 wherein said O-rings are slidably sealed to said sealing surface when said first clutch housing is nested in said second clutch housing.

6. A friction device as set-fourth in claim 1, including a single snap ring connected to said first housing for securing said first and second housings axially within a transmission case.

7. A friction device as set-fourth in claim 2, including a single snap ring connected to said first housing and to said transmission case for securing said first and second housings axially within said transmission case.

8. A friction device as set-fourth in claim 1, including a single snap ring connected to said first housing for securing said first and second housings axially within a transmission case.

9. A method for assembly of clutch devices in a transmission including the steps of providing a clutch housing having an open end and an inner diameter surface;

providing another clutch housing having a retention surface and an outer diameter surface configured to be nested in seated relationship within the inner diameter surface;

providing first and second clutch packs; preassembling said second clutch pack within the clutch housing having the open end; and preassembling the said first clutch pack within said another clutch housing;

axially nesting the preassembled second clutch pack with respect to said clutch housing having an open end and engaging the retention surface of said another clutch housing against said second clutch pack for retaining it within said first clutch housing.

10. A friction device comprising:

a transmission case;

a first clutch housing having a preassembled first clutch pack therein and a first clutch actuating piston;

a second clutch housing arranged coaxially of said first clutch housing including a second clutch actuating piston;

said second clutch housing grounded to said transmission case;

a second clutch pack located within said second clutch housing and said first clutch housing having a radially outwardly located shoulder thereon engaging said second clutch pack and configured for nesting within said second housing for securing said second clutch pack within said second clutch housing.

11. A friction device as set-forth in claim 10 wherein said second clutch housing has an open end and an inside diameter thereon; said first clutch housing having an outside diameter thereon nested within said inside diameter of said second clutch housing and coacting means on said first and second clutch housings for connecting them together against relative rotation therebetween.

12. A friction device as set-forth in claim 9, including a single snap ring connected to said first housing and to said transmission case for securing said first and second housings axially within said transmission case.

13. A friction device as set-forth in claim 11 wherein said inside diameter is a sealing surface and said first clutch housing having a pair of spaced radially outwardly directed shoulders thereon and seals located within said pair of spaced radially outwardly directed shoulders to be carried by said first clutch housing and sealed against said sealing surface.

14. A friction device as set-forth in claim 13, said first clutch housing having a cavity in said outside diameter of said first clutch housing and said seals defined by a pair of annular O-rings located within said pair of spaced radially outwardly directed shoulders for sealing said cavity for sealing a lubricant path including said cavity.

* * * * *